Feb. 5, 1963

P. G. SALERNO 3,076,471

MODULATING IN-LINE VALVE

Filed May 25, 1959

INVENTOR.
PAUL G. SALERNO
BY
*Milton J. Chamberlain*
ATT'Y

INVENTOR.
PAUL G. SALERNO

United States Patent Office 3,076,471
Patented Feb. 5, 1963

3,076,471
MODULATING IN-LINE VALVE
Paul G. Salerno, Glenview, Ill., assignor to Vapor Heating Corporation, Chicago, Ill., a corporation of Delaware
Filed May 25, 1959, Ser. No. 815,536
1 Claim. (Cl. 137—219)

This invention relates to in-line valves and has to do particularly with that type of valve having a simple fluid feedack loop for modulating valve operation.

The object of the present invention is to provide simple means, adaptable to automation, for establishing various flow rates through the valve and for maintaining flow at the established rate.

The invention is in the nature of an improvement over prior art in-line valves. The essential feature of the present invention is the fluid feedback loop. The loop is associated with a valve-actuating piston chamber as a mechanical linkage serving to enlarge the effective cross-sectional area of an inlet orifice through which fluid at line pressure enters the piston chamber. Inlet orifice area is minimized when the valve is fully closed and maximized when the valve is fully open. The loop thereby establishes a flow area into the piston chamber for each flow area established through an outlet leading from the piston chamber to atmosphere. The latter area is determined by positioning a pilot valve assembly interposed in said piston chamber outlet. The pilot valve assembly may be operated manually or automatically. If arranged to operate automatically, the pilot valve assembly may be made responsive to any desired controlling physical condition.

The ratio of flow area into the piston chamber to flow area out of the piston chamber establishes a pressure condition within the piston chamber which positions the valve in closed, open or some intermediate position. Basic control of the valve is established by manipulation of the pilot valve, but from the above it can be seen that for every position of the pilot valve there is a corresponding position for the valve proper. The valve is so designed that for every position there is a specific flow rate permitted through the valve. Should line pressure upstream of the valve vary, the feedback loop also serves to re-position the valve so as to maintain the established flow rate insofar as it is possible to accomplish this within the limitations of the valve. Obviously, the valve cannot deliver a rate of flow in excess of that supplied to it.

Figure 1:
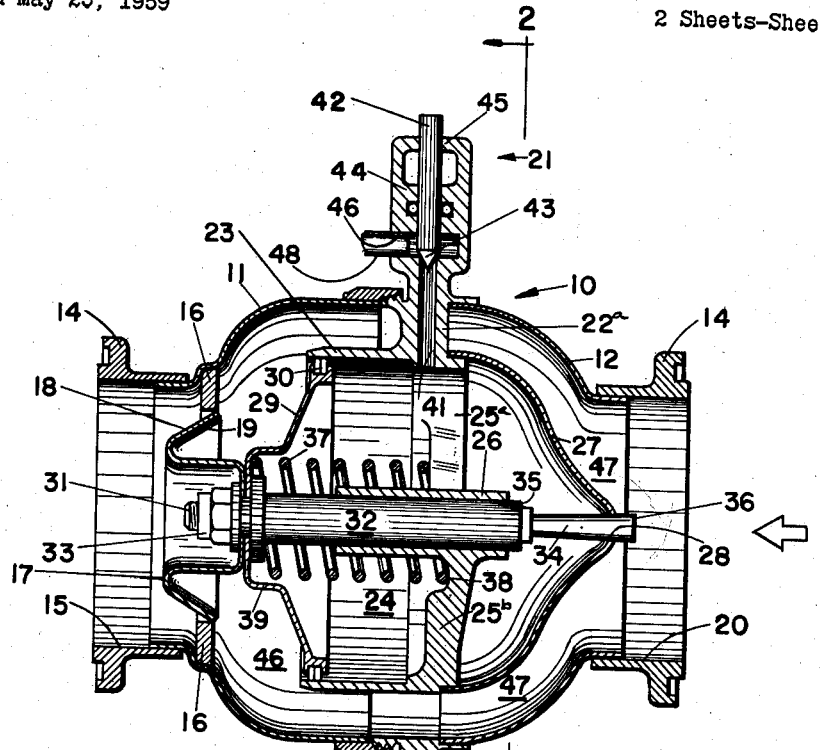
FIG. 1 is a longitudinal sectional view of the valve in closed position.
Figures 3, 4:
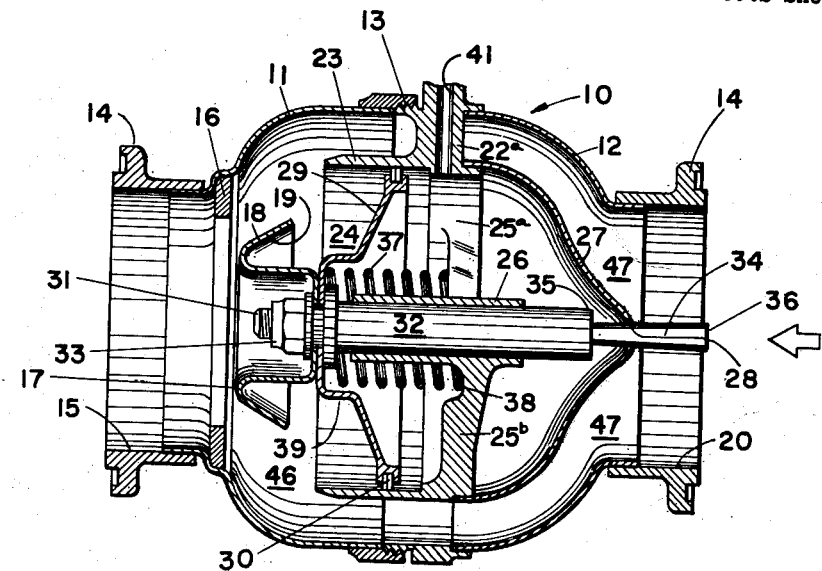
FIG. 3 is a longitudinal sectional view of the valve in an open position.
FIG. 4 is a longitudinal sectional view of the valve in a closed position with an alternative arrangement of the mechanical linkage of the fluid feedback loop.

Referring now to the drawings, the direction of fluid flow through the valve is indicated by a block arrow on each of the FIGS. 1, 3 and 4. As the present description proceeds it will be apparent that the valve is designed for uni-directional flow.

Figure 2:
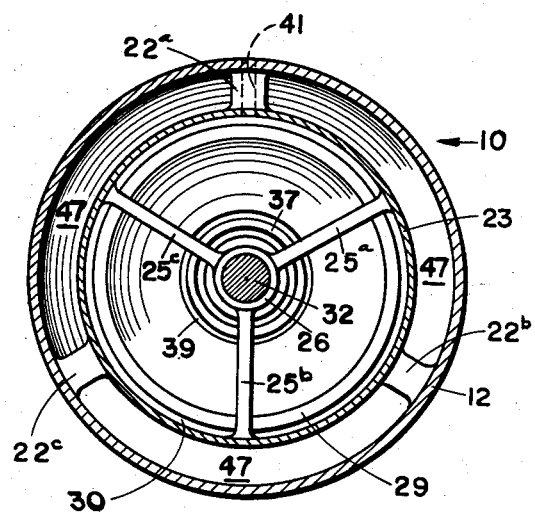
FIG. 2 is an end view of the valve taken on the line 2—2 of FIG. 1.

Considering first the structure of FIGS. 1–3, the valve housing 10 is made up of a downstream portion 11 and an upstream portion 12. The two are mateably joined into a leak-proof envelope by the threaded sleeve arrangement shown at 13. The housing 10 is then split for ease in assembling the valve. Opposite ends of the housing 10 are shown flanged, as at 14, for installing the valve assembly in a pipe line or conduit of an associated fluid system. Other attachment means may be substituted for the flanges 14, 14.

The downstream portion 11 has an outlet port 15 and an annular ported valve seat 16. The upstream portion 12 has an inlet port 20 and carries a pilot valve assembly 21 exteriorly of the valve proper. The upstream portion 12 also carries the structure defining the piston chamber 24 and the other valve parts.

The piston chamber 24 is defined by the cylindrical valve body 23, a cap 27 closing the upstream end of the body 23, and a piston 29 movable axially of and closing the downstream end of said valve body 23. The valve body 23 is supported within the valve housing by the web 22 designated by the reference numerals 22$^a$, 22$^b$, and 22$^c$. Another web 25 having members 25$^a$, 25$^b$, and 25$^c$ extending radially inwardly from the valve body 23 supports the valve guide 26.

The valve guide 26 receives a cylindrical valve stem 32 which is threaded at its downstream end 31 to receive a nut 33 by means of which the piston 29 and the poppet valve 17 are affixed to the valve stem. A tapered pin 34 is attached to and extends axially upstream of the upstream end 35 of the valve stem 32. The assembly comprised of the poppet valve 17, the piston 29, the valve stem 32, and the tapered pin 34 is movable as a unit axially of the body 23 and the housing 10 and, for ease in description, is hereinafter termed the piston-pin assembly.

The piston 29 may carry piston rings 30 at its circumference to sealingly close the piston chamber 24. It should be pointed out, however, that the specific configuration of the piston 29 is not important to the concept of this invention. For example, the piston 29 could be of relatively greater axial extent than is shown in the drawings. The added length would serve to guide the piston within the piston chamber 24 thereby rendering unnecessary the guide means provided by the combination of the web 25, the valve guide 26, and the valve stem 32. If such a piston were used in the valve of FIGS. 1–3, the tapered pin 34 could be affixed to the upstream side of the piston itself with the poppet valve 17 arranged on the downstream face of the piston in a manner similar to the illustrated arrangement. There would still be present in the structure a piston-pin assembly as that nomenclature has been defined.

Returning now to the structure shown in FIGS. 1–3, the poppet valve 17 has a tapered downstream face 18 which is receivable within and mateable with the annular ported valve seat 16. The tapered face 18, as it is moved axially upstream in a manner to be discussed, presents a progressively larger annular flow-way or outlet passageway through the valve. Fluid flow is thus metered at different values dependent upon the position of the poppet valve 17 relative to the seat 16. The upstream side of the poppet valve 17 is lipped, as at 19, so that line pressure acting against the lip 19 will force the valve into tight, sealing engagement with the valve seat 16 when the valve is closed.

A helical spring 37 within the piston chamber 24 serves to bias the piston-pin assembly downstream to normally close the valve. The spring is supported at its upstream end by the detents 38 provided in each of the web members 25$^a$, 25$^b$ and 25$^c$ and at its downstream end by a cylindrical downstream extension 39 formed in the piston 29.

An orifice 28 through which fluid flow is admitted to the piston chamber 24 is provided in the cap 27. An outlet passageway 41 formed in the web member 22$^a$ connects the chamber 24 to atmosphere. The pilot valve assembly 21 is interposed across the passageway 41. The pilot valve assembly 21 shown in the drawings for illustrative purposes includes a valve body 44 having valve guide means 45, a valve member 42 for metering fluid flow through the passageway 41 and an outlet port 46. The pilot valve assembly 21 may be of any suitable style or type so long as the valve member 42 has a tapered end 43 or the pilot valve assembly has other means whereby the flow through passageway 41 may be metered or adjusted in rate.

The fluid feedback loop is structurally represented by the piston-pin-type restrictor assembly including, specifically, the tapered pin 34, and the orifice 28. The loop is provided so that the effective cross-sectional area of the orifice 28 is varied in direct proportion to the cross-sectional area of the annular flow way between the seat 16 and the poppet valve 17. In other words, as the poppet valve 17 opens the orifice 28 is enlarged. In the valve arrangement shown in FIGS. 1 and 3 this is accomplished by extending the larger end 36 of the tapered pin 34 through and beyond the orifice 28 and moving the pin 34 relative to the orifice 28. An alternative arrangement for the structure of the fluid feedback loop is shown in FIG. 4.

Referring now to FIG. 4, like parts of the overall valve have been identified as in the above description so as to eliminate needless repetition. In this arrangement, the tapered pin 34' is fixed to one of the web members 25b' with its larger end 36' extending downstream through an orifice 28' provided in the modified piston 29'. The piston 29' has been modified to provide a plane surface for the orifice 28' which surface is perpendicular to the axis of the relocated tapered pin 34'. In this instance the pin 34' is stationary and the piston 29' moves over it to enlarge orifice area in direct proportion to the cross-sectional area of the annular flow way between the seat 16 and the poppet valve 17.

In either arrangement of the fluid feedback loop, the larger end 36 or 36', as the case may be, is no larger than the orifice 28 or 28'. This dimensional relationship is maintained to facilitate manufacture and assembly of the valve and, also, to preclude likelihood of the movable parts of the fluid feedback loop hanging-up on the stationary parts thereby preventing the poppet valve 17 from fully seating in the valve seat 16.

By reference to FIGS. 1, 3 or 4 it may be noted that the housing 10 is enlarged medially of the inlet port 20 and outlet port 15. The enlargement is obviously made to accommodate the piston chamber 24 but its dimension is selected, with reference to the dimension of the piston chamber 24, so that the annular flow space 47 defined by the housing 10 and the structure of pressure chamber 24 has a cross-sectional area substantially identical throughout the valve to the cross-sectional area of the inlet port 20 and the outlet port 15. This described equality of cross-sectional areas is maintained as to provide substantially laminar fluid flow through the valve and to insure that pressure throughout the valve, exclusive of that within the confines of the piston chamber 24, is substantially equal to line pressure of the inlet port 20.

The dimensional relationship between the poppet valve 17 and the piston 29 is also selected so that the piston has a relatively greater diameter than does the poppet valve. The difference in diameters makes possible the exposure of a greater piston area to valve pressure than poppet valve area and provides the basis for axial movement of the piston-pin assembly.

*Operation*

With the passageway 41 closed by the pilot valve 42, pressure within and without the piston chamber 24 is equalized through the orifice 28. The net force on the piston 29 is therefore zero and the pressure force acting on the upstream face of the poppet valve 17, aided by the spring 37, either closes the valve or maintains it in the closed position illustrated in FIG. 1. When the passageway 41 is opened by manipulation of the pilot valve 42, fluid within the piston chamber 24 is dumped outboard of the valve and pressure within the chamber 24 is reduced below the pressure level without the chamber 24. In cases where outboard discharge of the fluid would be objectionable, the fluid may be discharged through a suitable small diameter duct 48 to a point downstream of the valve. The difference in pressures, upon reaching a given value, works upon the piston 29 with a net force that is directed upstream and drives the piston-pin assembly upstream. This movement cracks the poppet valve 17 from the seat 16 and exposes the downstream face of the poppet valve to forces which add to the upstream forces acting upon the piston-pin assembly thereby driving the latter upstream with a positive movement.

The above described movement shifts the tapered pin 34 upstream, as illustrated in FIG. 3, and increases the effective size of the orifice 28. A greater flow of fluid is thereby permitted to enter the piston chamber 24. This flow of incoming fluid tends to rebuild pressure within the piston chamber and to compensate for the dumping of fluid through the pilot valve assembly 21. Theoretically, the piston-pin assembly is moved upstream until a balance or equilibrium is established within the piston chamber 24 as a result of the establishment of a ratio or relationship between inlet and outlet orifice sizes and the inlet and outlet flow rates established by those orifices. As a practical matter, it has been determined that a significant change of pressure within the piston chamber resulting from a change in pilot valve position causes the piston-pin assembly to reflect that change by shifting upstream or downstream, as the case may be, to a point beyond that necessary for establishing equilibrium in the piston chamber. Over compensation for the change occurs, apparently, from the momentum of the piston-pin assembly. The fluid feedback loop immediately applies corrective forces to re-position the piston-pin assembly to set up a flow rate through the valve proper corresponding to the position of the pilot valve.

As was pointed out earlier, the pilot valve assembly 21 shown is a simple, manually-operated valve. A more sophisticated valve is within the scope of present invention, however. Such a pilot valve may be responsive, for example, to pressure within the system downstream of the valve, in which case the valve will be a pressure regulator, or to temperature sensed upon a Wheatstone bridge which through appropriate circuitry energizes a solenoid-type pilot valve. Other modifications of the pilot valve will be readily apparent to those skilled in the art.

From the operation described it can be seen that for every position of the pilot valve there is a corresponding axial position for the piston-pin assembly. And, for every piston-pin assembly position there is a certain fluid flow through the annular passage between the poppet valve 17 and the valve seat 16. The fluid feedback loop alters piston-pin assembly position in response to variation in upstream line pressures to insure uniform flow through the valve and to provide a fully modulating in-line valve.

I claim:

A modulating in-line fluid pressure valve comprising: a generally annular housing open at opposite sides thereof providing axially aligned inlet and outlet ports of uniform cross-sectional area, a cylindrical body member fixed within said housing in spaced relation thereto and providing an unobstructed passage between said inlet and outlet ports of uniform cross-section area therewith, said cylindrical body member being open at one end opposing said outlet port and having at its opposite end a rigid closure cap facing said inlet port in fixed spaced relation thereto and providing a piston controlling chamber therewithin, said closure cap having a central port therethrough, a piston slidably mounted within said cylindrical body and chamber and movable between the ends thereof, a poppet-type line pressure modulating valve carried at one side of said piston in axial alignment with said outlet valve port, a pin-type restrictor member rigidly carried by the opposite side of said piston and extending axially through said piston controlling chamber and said central port in said closure cap, said restrictor member being tapered throughout its length in a direction to decrease the flow through said central port as said modulating valve closes, spring means biasing said piston and the valve and restrictor carried thereby in a direction to close said outlet port and said restrictor in a flow decreasing direction, and a throttle valve controlled port leading through said housing from said piston controlling chamber, whereby any desired degree of opening of said modulating valve may be maintained upon a selected degree of actuation of said throttle valve.

References Cited in the file of this patent

UNITED STATES PATENTS

| | | |
|---|---|---|
| 2,000,297 | Putnam | May 7, 1935 |
| 2,442,625 | Thomas | June 1, 1948 |
| 2,608,985 | Arthur | Sept. 2, 1952 |
| 2,699,316 | Mosher | Jan. 11, 1955 |
| 2,851,055 | Mosher | Sept. 9, 1958 |

FOREIGN PATENTS

| | | |
|---|---|---|
| 241,913 | Germany | Dec. 18, 1911 |